Sept. 9, 1958  C. T. ASBURY  2,850,862
CUTTING DEVICE
Filed Dec. 3, 1956  3 Sheets-Sheet 1

INVENTOR
CHARLES T. ASBURY

BY  *Taulmin & Taulmin*

ATTORNEYS

Sept. 9, 1958
C. T. ASBURY
2,850,862
CUTTING DEVICE
Filed Dec. 3, 1956
3 Sheets-Sheet 2
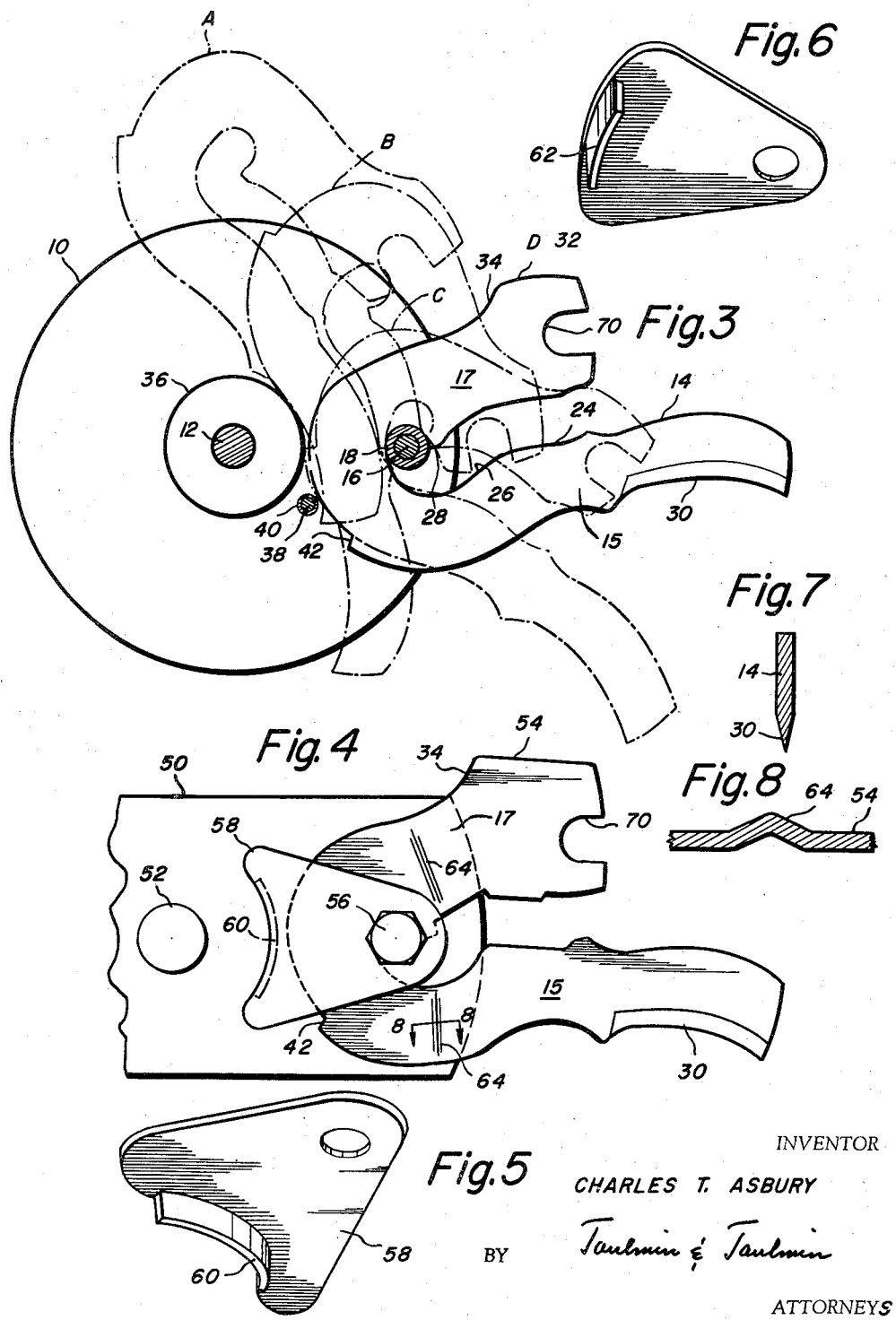
INVENTOR
CHARLES T. ASBURY
BY Toulmin & Toulmin
ATTORNEYS

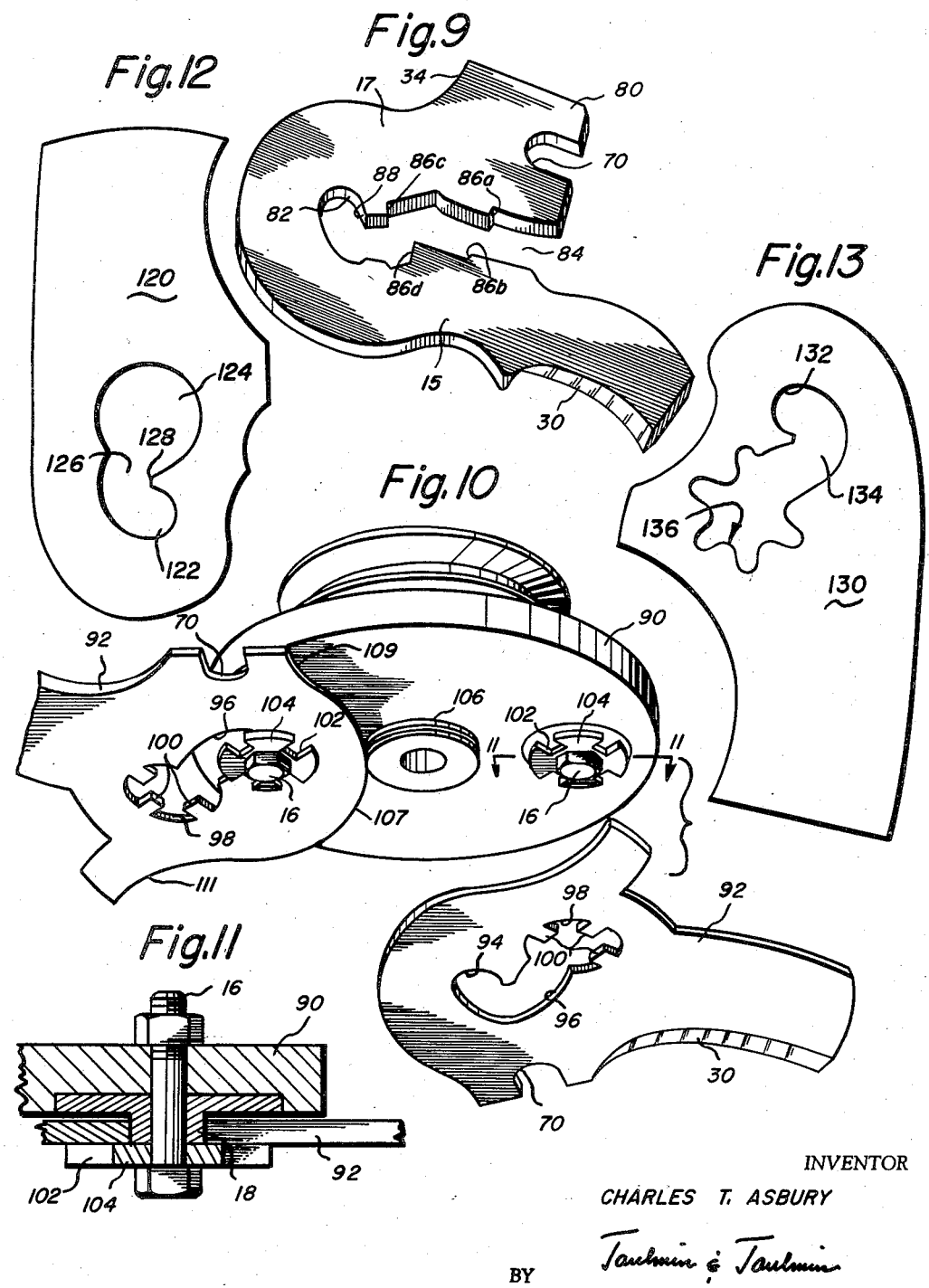

United States Patent Office 2,850,862
Patented Sept. 9, 1958

2,850,862

CUTTING DEVICE

Charles T. Asbury, Fort Lauderdale, Fla.

Application December 3, 1956, Serial No. 625,791

4 Claims. (Cl. 56—295)

This invention relates to cutting devices, and is particularly concerned with a cutter blade and an arrangement for supporting the cutting blade on a rotary holder therefor.

A particular object of this invention is to provide an improved cutting element as for lawnmowers or edgers, or the like, characterized in being easy to attach to and remove from a supporting holder.

Another object of the present invention is the provision of a swingable type cutting element which can be manually assembled with the holder therefor, and manually removed therefrom without the use of any tools whatsoever.

A still further object is the provision of a manually detachable cutter element of the nature referred to which is so arranged as not to become dislodged from the supporting holder accidentally during any normal useage of the device.

A still further object of this invention is the provision of a novel, swingable type cutting element in the form of a flat bar adapted for being formed from a simple stamping whereby the resulting product is economical to produce and inexpensive to replace.

It is also an object of the present invention to provide a swingable type cutter element for lawnmowers or lawn edgers, or the like, in which a sickle cutting action is had thereby improving the cutting efficiency of the cutting element.

These and other objects and advantages of this invention will become more apparent upon reference to the following specification taken in connection with the accompanying drawings, wherein:

Figure 3 is a view similar to Figure 1, but shows several of the positions which a cutting element will occupy in being assembled with a holder therefor;

Figure 4 is a fragmentary view showing a modified construction wherein a different type retainer is employed, thus permitting the use of a different sort of holder plate;

Figure 5 is an enlarged perspective view looking up at the underneath side of the retainer of Figure 4;

Figure 6 is a view similar to Figure 5, but showing a modified form of retainer for use with the Figure 4 holder;

Figure 7 is a sectional view indicated by line 7—7 on Figure 1 drawn at enlarged scale, showing the manner in which the cutting element is provided with a sharpened edge along a concave portion thereof, thus forming a sickle cutting edge;

Figure 8 is a sectional view through a blade as indicated by line 8—8 on Figure 4 drawn at enlarged scale, showing the manner in which the blade can be ribbed if necessary to provide it with sufficient stiffness to withstand impacts that might be encountered under certain circumstances.

Figure 9 is a perspective view showing an improved type swingable cutter element in which the slot, by means of which the cutter element is mounted, is formed with a plurality of offsets therein;

Figure 10 is a perspective view showing a holder and a still different type of swingable cutter element according to the present invention;

Figure 11 is a perspective view indicated by line 11—11 on Figure 10 drawn at enlarged scale.

Figure 12 is a plan view showing a cutter of a somewhat modified form; and

Figure 13 is a plan view showing still another modification of the cutter which is somewhat similar to the cutter of Figure 10.

Figure 1:
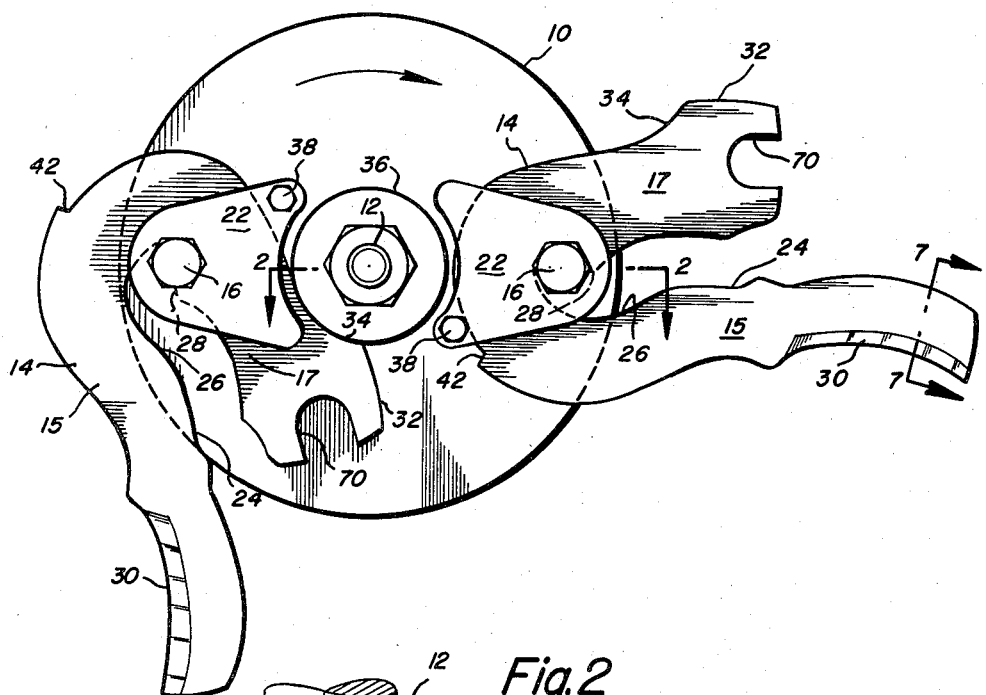
Figure 1 is a view looking in at the face of a rotary cutter embodying a cutting element and retaining member therefor.
Figure 2:
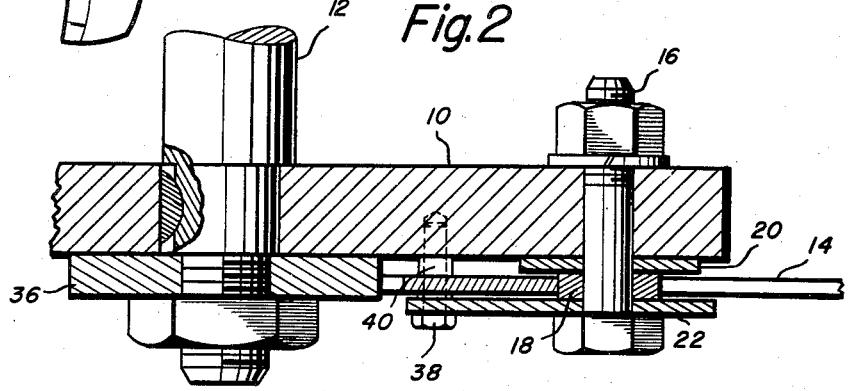
Figure 2 is a sectional view indicated by line 2—2 of Figure 1 but drawn at enlarged scale.

Referring to the drawings somewhat more in detail, Figures 1 and 2 show a rotary holder 10 mounted on a shaft 12 for being driven in rotation thereby.

According to the present invention, there are two or more flat bar cutting elements 14 swingably carried by holder 10. Each cutting element 14 is pivotally mounted on the shank of a pivot bolt or support pin 16, as by means of the collar 18 thereon, which fits into an aperture in the blade and which cutting element is located between a washer 20 and a retaining member 22 so as to be freely movable therebetween in the plane of the cutting element.

Each cutting element is provided with a tortuous slot 24 leading from the said aperture within which the collar 18 is freely slidable. The tortuous slot 24 extends inwardly toward said aperture, the center of which forms the pivot point for the cutting element, and then at an angle thereto as at 26, and then turns inwardly toward the pivot point so that there is a projection 28 extending out in front of the collar 18 so that the cutting element cannot be moved straight inwardly in order to dislodge it from engagement with the collar. The end of slot 24 opposite the said aperture forms a point of entry into the slot of the support pin or pivot bolt.

The outer end of the longer leg 15 of the cutting element is concave in the direction of rotation of holder 10 and the edge of the concave portion is sharpened as indicated at 30, so as to provide for a sickle cutting action.

The shorter leg 17 of the cutting element is provided with an enlarged end part 32 joined with the cutting element by the curved portion 34. Curved portion 34 is so located, and is of such a radius as to engage central collar 36 of holder 10 when the cutting element is swung counterclockwise about its pivotal support to the position occupied by the cutter on the left side of Figure 1.

Each cutting element is thus yieldable upon striking an object such as a stone or stump, or the like, thereby to prevent damage to the mower or edger. Likewise, in extremely heavy cutting operations as in the case of dense growth, the cutting elements will tend to yield backwardly somewhat, thereby not only enhancing the sickle cutting action of the cutting edges 30, but also reducing to some degree the area being covered by the mower, or the like, whereby under all conditions of operation efficient and safe cutting action will be obtained.

The retainer 22 is provided with a second screw 38 with a spacing and stop collar 40 being retained thereby between the retainer 22 and holder 10. This spacing and stop collar is availed of for providing the space into which the longer leg of the cutting element is introduced when the cutting elements are assembled with the holder.

Further, each cutting element is provided with a shoulder 42 adapted for engaging the collar 40 when the cutting element is swung clockwise about its pivot point, while at the same time being shifted slightly inwardly thereon.

In this manner, any accidental dislodging of the cutting element from the pivot collar 18 is prevented and, instead, removing of the cutting element from the pivot collar is an operation which must be carried out deliberately and with care.

As will be seen in Figure 3, the movement of the cutting element into and out of its assembled position with the holder is such that accidental dislodging of the cutting element from the holder is virtually impossible. Figure 3 shows the cutting element in positions A, B, C, and D; and, it will be observed that the cutting element must be turned as it is moved inwardly into position, so that a complex motion of the cutting element occurs during assembling and disassembling thereof which would scarcely be duplicated under any conditions except a deliberate manual movement of the cutting element.

In the Figures 1 and 2 modifications, the cutting elements are adapted for stopping against the collar or washer 36 in the center of the holder. Such an arrangement is of an advantage because it enables cutting elements according to my invention to be employed with existing holders when these holders are provided with the retaining elements described.

However, it may be desired also to employ my cutting elements with a different type holder having no central collar or washer, or to mount them on a transverse bar likewise not provided with a central collar or washer. In this case, suitable means are provided for stopping the cutting element by a special construction of the retainer, as will be observed in Figures 4–6.

In Figure 4, there is shown a bar 50 supported on a shaft 52 for rotation. A cutting element 54 of the nature described above is mounted on a pivot bolt or pivot pin 56. This bolt or pin also fixes a retainer 58 to bar 50, and this retainer 58 is provided at its inner edge with a dependent wall portion 60 that not only establishes its narrow passage through which the cutting element is received, but also provides stop means for engagement by the aforementioned stop portions 34 and 42 of the stop element in order to limit its normal swinging movements about the pivot pin.

Figure 6 shows a retaining member quite similar to member 58, but wherein the dependent wall portion 62 is convex toward the center of the holder rather than concave as in the case of Figure 5 modification. In either case, the wall portion 62 provides the stop means to limit the swinging movement of the cutting element, while at the same time retaining the cutting element in assembled relation with the rotatable holder therefor.

For certain classes of work, particularly where there may be a great many stones or stumps, or where the cutter might frequently be driven into the ground, or where the vegetation being cut is extremely dense, or for heavy edging operations—or in any other circumstance where the cutting element might be bent—it is contemplated that the cutting element may be ribbed along substantially transversely as indicated by the rib 64 in Figure 8. The cutter could be ribbed lengthwise if desired. This simple rib formation would greatly strengthen the cutting element, and could be embodied therein at the time of blanking out the cutting element.

It may be desirable to check the wear that occurs on the cutting element where it engages the pivot collar 18 from time to time in order to maintain the mower or the like in safe operating condition and to avoid all opportunity for the cutting element to break or to become dislodged from the holder by reason of a worn pivot portion. A simple means can be provided for checking the wearing of the pivot region of the cutting element with a recess 70 so located that a simple snap gage could be used for checking position of the pivot region of the cutting element relative to the fixed and accurately located notch edge.

Figure 9 shows a cutter element 80 having a central recess 82 adapted for receiving the the pivot pin for swingably supporting the element and having the slot 84, by means of which the device is placed on the pivot pin. Slot 84, it will be noted, is irregular in outline and comprises a plurality of abrupt offsets as at 86a, 86b, 86c, and 86d and including a projection 88 extending out in front of the aperture 82 in which the pivot pin rests so that there is substantially no likelihood of the cutting element becoming dislodged accidentally.

Figure 10 shows a holder 90 with cutting elements 92 thereon which are characterized in that the aperture 94, adapted for receiving the pivot pin, has a slot approach 96 leading thereto which terminates in a second aperture 98. Aperture 98 is provided with a plurality of inwardly extending teeth or fingers 100 and these teeth 100 must register with the notches 102 in a washer 104 fixed to the outer end of the pivot pin for the cutting element before the cutting element can be placed in position. It will be evident that the cutting element in Figure 10 combines the feature of substantially eliminating any accidental dislodging of the supporting pivot pin from the receiving aperture therefor, with the feature of requiring a precise and deliberate manual manipulation of the cutting device before it can be removed from the holder, thus virtually eliminating all possibility of accidental removal of the cutting elements from the holder.

The cutting elements in the Figure 10 modification, similarly to those previously described, are arranged for limited swinging movement on the supporting pivot pin, and has means limiting the forward and backward swinging movement of the cutting element about its supporting pivot pin, and which means may take the form of the central washer 106 on the holder engaging the edge 107 of the cutting device and adapted for abutting curved path 109 and 111 when the cutting element swings a predetermined distance forwardly or backwardly from its normal position on the holder.

The cutting element of Figure 10 is also very strong because the two leg portions are integrally joined together.

As will be seen in Figure 11, the cutter has a slight clearance beneath the holder 90 so as to be freely swingable thereon, similarly to the cutter arrangements previously described.

Turning now to Figure 12, there is shown a cutter arrangement 120 of the same general type as illustrated and described in Figure 10, but wherein the smaller aperture 122 in which the pivot pin rests is connected with a larger aperture 124 adapted for receiving a washer not shown corresponding with washer 104 in Figure 10, and with the apertures being connected by passage 126, including a projection or obstruction 128 extending in front of the aperture 122 whereby substantially to eliminate the possibility of any accidental displacement of the cutter from the holder.

In Figure 13, there is shown a similar cutter arrangement 130 in which the smaller aperture 132 that receives the pivot pin of the holder is connected by passage 134 with an aperture 136 of generally irregular outline, and which outline, similarly to the outline of the opening in the Figure 10 modification, is adapted for receiving a washer of about the same shape but slightly smaller.

The Figure 13 arrangement is somewhat easier to form than the Figure 10 arrangement, and does not materially weaken the cutter by having new sharp corners therein. The Figure 13 arrangement, similarly to that of Figure 10, has the advantage that it is virtually impossible for the cutter accidentally to become dislodged from the holder.

All of the cutters illustrated are characterized in being freely swingable, and in being of such a nature as to prevent their accidental dislodgement from the pivot pin of the holder and will yield backwardly so as to decrease the width of the path being cut when heavily loaded; or, will yield when an obstruction is encountered and may also be considered to be characterized by an arcuate sickle type cutting edge.

It will be understood that the feature of the sickle cutting edge, while an important and novel feature of my invention, is not in itself essential to the arrangement whereby the cutters are prevented from becoming accidentally dislodged from the holder. The sickle cutting edge is best taken advantage of by swingably supporting the cutter element as is disclosed in the present application, and the cutter per se has the greater adaptability and utility when provided with a mounting arrangement of the nature illustrated and described.

It will be understood that this invention is susceptible to modification in order to adapt it to different usages and conditions; and, accordingly, it is desired to comprehend such modifications within this invention as may fall within the scope of the appended claims.

I claim:

1. In a cutting device; a holder, a support pin on the holder outwardly from the center thereof, a flat plate having a longer leading leg and a shorter trailing leg fitted over said support pin, the leading side of the longer leg being concave and sharpened to provide for a sickle cutting action, and means carried by the holder adapted for abutting the outer edge of said blade in two rotated positions on said pivot pin on opposite sides of the position occupied by the blade when in its normal position when the holder is rotating, thereby to limit swinging movement of the blade on the pivot pin and to prevent accidental dislodging of the blade from the pivot pin.

2. In a cutting device; a rotary holder, a pin on the holder radially outwardly from the center of rotation thereof, a bifurcated cutting element mounted on the pin, the leading side of said cutting element being concave and sharpened to provide for a sickle cutting action; said cutting element normally extending radially outwardly from said pin on account of centrifugal force when the holder rotates, and means on the holder adapted for engagement by the blade operable for limiting the swinging movement of the cutting element on the pin in both forward and backward directions from said radial direction.

3. In a cutting device; a rotary holder, a pin on the holder radially outwardly from the center of rotation thereof, a bifurcated cutting element mounted on said pin, the leading side of said cutting element being concave and sharpened to provide for a sickle cutting action when the device rotates, and a retainer element secured to the said pin and forming with said holder a slot for receiving the cutting element, said retainer element comprising a body portion parallel with the cutting element and an edge portion in the region of the center of the holder extending axially inwardly and in engagement with the holder.

4. In a cutting device; a rotary holder, a support pin extending axially from the holder radially outwardly from the center of rotation thereof, a retainer element secured to the outer end of said pin parallel to said holder, a bifurcated cutting element mounted on the pin between said retainer element and said holder and having the leading side of the forward leg thereof concave and sharpened, a projection in the center of said holder adapted for engaging the trailing leg of the said cutting element when the same is swung backwardly from its normal radial position, and stop means pertaining to the retainer element for stopping the cutting element when swung forwardly from its said normal radial position.

References Cited in the file of this patent

UNITED STATES PATENTS

| | | |
|---|---|---|
| 2,592,755 | Soenksken | Apr. 15, 1952 |
| 2,635,663 | Schmidt | Apr. 21, 1953 |
| 2,781,563 | Horth | Feb. 19, 1957 |